United States Patent
Owings

(10) Patent No.: US 9,556,048 B1
(45) Date of Patent: Jan. 31, 2017

(54) CHAIN FILTER SYSTEM OF MICRO WETLAND CELLS AND METHOD OF FORMING SAME

(71) Applicant: Samuel S. Owings, Chestertown, MD (US)

(72) Inventor: Samuel S. Owings, Chestertown, MD (US)

( * ) Notice: Subject to any disclaimer, the term of this patent is extended or adjusted under 35 U.S.C. 154(b) by 0 days.

(21) Appl. No.: 15/270,517

(22) Filed: Sep. 20, 2016

Related U.S. Application Data

(60) Provisional application No. 62/244,831, filed on Oct. 22, 2015.

(51) Int. Cl.
| | |
|---|---|
| *E03F 1/00* | (2006.01) |
| *E03F 5/10* | (2006.01) |
| *C02F 3/32* | (2006.01) |
| *C02F 1/00* | (2006.01) |
| *C02F 3/04* | (2006.01) |
| *E02B 11/00* | (2006.01) |
| *E02B 3/04* | (2006.01) |
| *E03F 5/14* | (2006.01) |
| *C02F 3/06* | (2006.01) |
| *C02F 103/00* | (2006.01) |

(52) U.S. Cl.
CPC ............... *C02F 3/327* (2013.01); *C02F 1/004* (2013.01); *C02F 3/04* (2013.01); *C02F 3/06* (2013.01); *E02B 3/04* (2013.01); *E02B 11/00* (2013.01); *E03F 1/00* (2013.01); *E03F 5/103* (2013.01); *E03F 5/14* (2013.01); *C02F 2103/001* (2013.01)

(58) Field of Classification Search
CPC .............. E03F 1/00; E03F 1/001; E03F 1/002; E03F 5/103; E02B 3/04; E02B 11/00; C02F 3/06; C02F 3/32; C02F 3/327
USPC .... 210/602, 617, 747.2, 747.3, 150, 170.03; 405/36, 52
See application file for complete search history.

(56) References Cited

U.S. PATENT DOCUMENTS

| | | | |
|---|---|---|---|
| 3,429,806 A | 2/1969 | Carter et al. | |
| 3,556,026 A | 1/1971 | Houston | |
| 4,254,831 A | 3/1981 | Nuzman | |
| 5,174,897 A | 12/1992 | Wengrzynek | |
| 5,330,651 A | 7/1994 | Robertson et al. | |
| 5,342,144 A * | 8/1994 | McCarthy | E03F 1/00 405/36 |
| 5,823,711 A | 10/1998 | Herd et al. | |
| 6,319,405 B1 * | 11/2001 | Roy | C02F 3/327 210/602 |

(Continued)

*Primary Examiner* — Christopher Upton
(74) *Attorney, Agent, or Firm* — Stanzione & Associates, PLLC

(57) ABSTRACT

A chain filter system established generally across a slope such as an agricultural field, residential area, reclamation site, industrial area, or municipal park, etc. The system comprises a series of basins oriented such that their upstream borders are aligned to capture variously directed stormwater runoff from the drainage area. Along each basin border opposite to the upstream border is extended a generally continuous berm to direct and contain stormwater movement, so as to avoid loss of runoff from and around the basins. The berm may include gates or scuppers for controlled release of captured stormwater runoff. This chain filter system serves to capture runoff for purposes of reducing pollution movement into state waters, flood control, creating wildlife habitats, enhancing aquifer levels in rural and urban settings, and avoiding downstream pollution.

18 Claims, 5 Drawing Sheets

(56) References Cited

U.S. PATENT DOCUMENTS

| | | |
|---|---|---|
| 6,712,969 B2 | 3/2004 | Madrid |
| 8,152,997 B1 | 4/2012 | Olson et al. |
| 8,333,895 B2 | 12/2012 | Albers et al. |
| 8,640,387 B2 | 2/2014 | Harrison et al. |
| 8,877,048 B1 | 11/2014 | Owings |
| 2003/0019150 A1 | 1/2003 | St.Onge et al. |
| 2005/0161407 A1 | 7/2005 | McPhillips |
| 2007/0160424 A1* | 7/2007 | Underwood ............ E03F 1/002 405/36 |
| 2009/0290936 A1* | 11/2009 | Underwood ............ E03F 1/002 405/52 |
| 2010/0200480 A1* | 8/2010 | Kania .................... C02F 3/327 210/150 |
| 2013/0299403 A1 | 11/2013 | Drake |

\* cited by examiner

CHAIN FILTER SYSTEM OF MICRO WETLAND CELLS AND METHOD OF FORMING SAME

CROSS-REFERENCE TO RELATED APPLICATIONS

This application claims priority from Provisional Application No. 62/244,831, filed on Oct. 22, 2015, in the United States Patent and Trademark Office, the disclosure of which is incorporated herein in its entirety by reference.

BACKGROUND OF THE INVENTIVE CONCEPT

1. Field of the Invention

The present general inventive concept relates generally to addressing problems posed by runoff from rainfall, snowmelt and other sources (collectively referred to herein as "runoff" or "stormwater runoff") particularly where unmitigated runoff can pose multiple threats. Specifically, if unabated, runoff can carry harmful pollutants to rivers, streams and bays, as well as bypass the natural process of groundwater or aquifer replenishment. This disclosure proposes a novel solution to unabated runoff embodied as a system and method that apply equally as well to runoff from urban, industrial, agricultural and residential slopes so as to avoid property destruction, erosion, environmental pollution and the like, as well as enhance diminishing aquifer levels.

2. Description of the Related Art

Melted snow and rain water, when not evaporated or directly channeled to tributaries, lakes, bays and oceans, can be expected to deliver seriously deleterious impact on properties and systems ranging from residential housing tracts to industrial and recreational parks, water reservoirs and wastewater treatment facilities. This melted snow or rainwater, or runoff, carries with it the potential for landscape erosion and property destruction and the unwelcome transport of a variety of pollutants with considerable risk to human health and environment. Another serious problem is that rapid "off-flow" moves so quickly across terrain that depleted aquifers are rarely sufficiently recharged. Still worse, unabated runoff can take its toll on human lives as it overwhelms seawalls, undermines foundations, sweeps motor vehicles from highways and collapses bridges and dams.

Runoff can prove damaging in other ways apart from its persistent force. Even low volume or infrequent runoff can bring irreparable erosion to parkland and coastlines. Runoff issues most often discussed are in the context of rural and agricultural venues, yet the economic and environmental impacts are at least as great or even greater in urban, industrial and residential settings. The U.S. Environmental Protection Agency (see epa.gov) documents that stormwater from streets, parking lots, and other paved surfaces carries a considerable quantity of pollution directly into tributaries and waters there beyond. EPA reports that impervious surfaces of a city block generate five times more runoff than a wooded area of the same size. More specifically, EPA studies reveal the runoff/absorbed ratio for urban settings at 55%/15%. Contrastingly, for natural settings, the ratio is reversed. For both, the balance of approximately 30% of stormwater is evapotranspired, meaning that the remaining stormwater is transferred from the land to the atmosphere by evaporation from the soil and other surfaces.

Toxic materials in cityscape runoff can include dirty sediment, heating oil, automobile grease, antifreeze and brake fluid, rodent poisons, herbicides, pesticides and fertilizers from lawns and golf courses, parks and highways, pathogens and bacteria from pet waste and leaking septic systems, road salts and heavy metals—all naturally flushed from city streets and dispatched untreated into rivers, lakes, and bays. Worse still, are countless fatalities wrought by unexpected flash floods—the leading cause of weather-related deaths in the United States, approximately two hundred per year. See Floodsmart.gov.

Over the years, many stormwater capture and control concepts have been proposed and explored in both urban and rural settings but have enjoyed limited success for a number of reasons. Typically these control concepts focus on varied applications of (1) filter strips, (2) grass waterways and (3) wetlands (natural and constructed); each of which delivers unique advantages. In a manner of speaking, these concepts "hold water" only to a certain extent.

"Filter strips" generally are embodied as narrow, vegetative bands (grass or trees) strategically planted along edges of streams, rivers, and bays. Typically these narrow vegetative bands are planted in various widths—as narrow as twenty feet or as wide as several hundred feet. As stormwater runoff races across a landscape and subsequently passes through the filter bands, sediment and nutrients are captured within the strips thus preventing pollutants from migrating to streams, reservoirs and tidal waters. The problem with filter strip practice is that an unusually heavy rain event brings such a high flow rate of stormwater runoff that only a relatively small portion of the flowing pollutants can be captured. Moreover, since runoff may travel a considerable distance, perhaps miles, before encountering filter strips residing only along stream or bay edges, the significant baggage of accumulated pollutants simply cannot be effectively filtered.

"Grass waterways" (in some environs referred to as "floodways") consist of relatively low grassy areas along which stormwater flows as it runs off city parks, sports stadium areas, shopping center parking lots and agricultural fields. Waterways are configured and strategically located to follow a declining grade ultimately leading to a stream/river/bay. This runoff control practice can be effective in preventing gullies or washout ditches from forming, thereby avoiding property damage and discouraging eroded sediment from being swept into stream/river/bay waters. Enhanced by plantings, "waterway vegetation" is judged somewhat effective as a natural filtering system accomplishing objectives essentially the same as filter strips. Unfortunately, both approaches generally fail in their filtering role in the face of heavy stormwater accumulations and the consequential acceleration of long distance runoffs.

"Wetlands" is the general name for natural or excavated land areas where water covers the soil or is present near the soil surface or within the root zone—at least for varying time periods. Recurrent or prolonged presence of water (hydrology) at the soil surface is the dominant factor determining the soil nature and types of plants living in the soil. Wetlands are characteristically defined by the presence of plants (hydrophytes) adapted to life in hydric soils subjected to flooded or saturated conditions. See Mitsch, W. J. and J. G. Gosselink, 1993; Wetlands, 2nd Ed. John Wiley & Sons; New York; 722 pp. Wetlands may be natural or human-made and more contemporaneously are valued for naturally handling high volumes of runoff, particularly near large cityscapes.

New Jersey's Department of Environmental Protection recently noted that wetlands were "previously misunderstood and typically destroyed as wastelands." Regardless of name, they are now widely recognized for their vital ecological and socioeconomic contributions—such as enhanced and relatively inexpensive protection of drinking water by filtering out chemicals, pollutants, and sediments, and soaking up runoff from heavy rains and snow melts. See the 2015 Report, State of New Jersey's Division of Land Use Regulation.

Besides, wetlands often serve as buffers by slowing the flow of pollutants into tributaries and onward to larger bodies of water such as the Chesapeake Bay and its tributaries. As polluted stormwater runs off the agricultural land and passes through wetlands, the hydrophytes, e.g. trees and grasses native to the wetland soil, serve to filter and absorb nutrients, suspended sediments and chemical contaminants. See the Chesapeake Bay Program Watershed Project, Annapolis, Md. website at chesapeakebay.net/wetlds1.htm. On the other hand, wetlands do have their shortcomings. In their natural occurrence they are reasonably effective only when they happen to be strategically located with respect to flows of city and/or agricultural runoff. Constructed (or manmade) wetlands are extremely expensive to create, particularly considering the plantings involved. Similar to filter strips and waterways, a heavy rain event can deliver such heavy volumes of runoff that the resultant flow through the wetlands overrides its capacity to effectively address sediment and nutrients.

These widely popular "solutions" have fallen short of their good intentions, leading to the development of still other approaches. The patent literature reflects ongoing interest in developing commercializable systems to address the challenge of stormwater runoff pollution and contamination treatments as well as bolstering diminishing aquifers.

U.S. Pat. No. 5,823,711 granted to Herd et al. presents a system for trapping and recycling surface water containing treatment chemicals, particularly on golf courses and possibly farms. This patented drainage and collection system includes a graded channel in which is secured a water impervious liner covering the channel bottom and wall surfaces. Scrap automobile tire components are positioned within the channel and on top of the liner. The surface water percolates through and around the scrap tire components, runs down the grades of the liner, and collects within the reservoir. A pumping station cooperates with an irrigation system to recycle the water and chemicals back to the surface of the golf course or the like. The objective of the Herd system is the collection, storage, and recirculation of water and chemicals used to maintain the field area. Repeatedly recycled fertilizer-laden runoff, of course, has its own natural limitations in terms of continued effectiveness and scale of application.

Wengrzynek's U.S. Pat. No. 5,174,897 describes a staged construct comprising (in hydraulic order) a sediment basin, level-lip spreader, grassy filter, wetland, and deep pond. The combination of these elements acts to remove pollutants from nonpoint source runoff. Wetlands are planted with vegetation that encourages growth of aerobic and anaerobic bacteria helpful in removing and detoxifying contaminants. This would appear to be a grand scale approach, and essentially un-scalable.

In U.S. Pat. No. 5,330,651 entitled "Treatment of Contaminated Agricultural Runoff," Canadian inventors Robertson, Blowers and Ptacek present a system of land drains to convey nitrate-polluted run-off water from a field to a reservoir. This reservoir would be large enough to contain excess quantities of stormwater run-off. From the reservoir, the water enters a collection tank containing submerged wood or other organic carbon material. The wood is kept under water, i.e., under anaerobic conditions, whereby nitrates are broken down by biochemical action. Sufficient wood is added and flow rate is adjusted such that the nitrate-polluted water spends many hours in contact with the wood. The objective is to provide a treatment for breaking down the nitrate in water washed off an agricultural field so that run-off water eventually passing away from the field is substantially nitrate-free. The Robertson et al. invention is mainly concerned with treating water that enters drainage ditches, land-drains. This system may or may not sufficiently treat the nitrate-laden water and does little or nothing with respect to accompanying pollutants, all of which then depart for the estuaries and coast.

Published Patent Application 2003/0019150 presents a "Reclamation System for Agricultural Runoff." This patent application filed by St Onge and Smith relates to systems for collecting excess water applied to crops, treating the collected water and reusing the treated water for agricultural purposes, or delivering the treated water to ground water streams. The inventors' objective is to achieve cost savings, healthier plants, and reduce the environmental burden. The disclosed systems are said to significantly reduce costs incurred in providing water, nitrogen fertilizer, herbicides and/or pesticides to crops by capturing as much as possible of the water provided to the planting area which is not taken up by the planted crops, treating that captured water with ozone, and reapplying the ozone treated water to the crops. According to the patent applicants, the quality and quantity of food stuffs produced are increased by the process. This is another scheme for continuously recycling pollutants.

Harrison and Turnbull received U.S. Pat. No. 8,640,387 for a water harvesting system adapted to a sports arena where a playing surface operates as a part of a water catchment arrangement and reservoir beneath the playing surface. Water may be discharged from the reservoir for consumption or other uses. Stadium seating area is impervious so as to direct water toward the playing field for capture thereunder.

Nuzman received U.S. Pat. No. 4,254,831 for his method and apparatus for restoring and/or maintaining an underground aquifer water supply system plagued with decreased water flow attributable to accumulation of undesirable flow impeding agents in the aquifer. He presented a plurality of injection wells drilled in the ground in surrounding relationship to the production well and a part of the water from the discharge thereof is treated with an additive capable of altering the nature of the plugging agents and returned to the aquifer via the satellite injection wells on a continuous basis.

U.S. Pat. No. 8,152,997 was granted to Olson, Johnson and Langford related to stormwater control including conveyance, filtration and discharge systems. The conveyance system includes a set of conduits and connections providing a flow path through a compacted soil embankment from an upper inlet to a lower discharge area of an underlying soil infiltration zone. The control system has configurations for transferring stormwater from pervious and impervious surfaces to the soil infiltration zone. This control system optionally includes a media filter device that may be installed within the conveyance system to intercept sediment and other contaminants prior to discharge within the underlying soil infiltration zone.

In his U.S. Pat. No. 8,877,048, inventor Samuel Owings describes a series of cascading basins excavated along a sloped floodway typically established between adjoining agricultural fields. These basins address problems of stormwater runoff from agricultural lands and certain urban areas where runoff carries sediment, nitrogen, phosphorous and other pollutants into nearby streams, rivers and tidal waters. The cascading basin series begins with basin placement at a higher topographical elevation, then positioning additional basins downwardly along a natural or excavated floodway slope demonstrating a terraced effect. As an upper basin is filled it overflows into a second basin terraced therebelow. Overflow of the second and sequential basins continues down-slope. Thoughtfully configured, angular features of basin exit grade and escape slopes retard egress of stormwater. A lowermost terminal basin selectively includes sand berm, boulders, rip rap (loose stones) and other barriers to retain the polluted runoff. Basins may include vegetation, slag stone layers, and other pollutant treatment elements.

In U.S. Pat. No. 8,333,895, patentee Albers and Amell describe a runoff capturing pond with a tangential entry point and central outlet. The capturing pond initially contains a volume of clarified water. Contaminated runoff is directed through the entry point and proceeds to displace the clarified water in an inward spiral toward the outlet where it is discharged. This results in an increased residence time for the contaminated water to become treated and settled.

Inventors Carter and Wiser received U.S. Pat. No. 3,429,806 depicting a series of recycling stabilization treatment ponds positioned on a downhill slope, ultimately leading to a final aeration pond from which overflow is discharged to a stream.

Published US Patent Application 20130299403 filed by Susannah Drake discloses a system for reducing runoff from an urban area into a body of water. In one embodiment, water flows from a sedimentation basin and into plurality of bio-retention cells, each extended at an angle relative to the sedimentation basin. Overflow water flows from the plurality of bio-retention cells into an elongated filter. In another embodiment, a system for reducing run off from an elevated road is disclosed. The system includes an enclosure with a sedimentation basin and a bio-filtration basin.

In his U.S. Pat. No. 3,556,026 Houston describes a farming method to conserve available rainfall comprising the forming of a plurality of elongated, spaced-apart, open-top slots in the soil surface and the construction of laterally extending, moisture transfer retarding barriers adjacent the slots to force rainfall from the adjacent field area into the slots. The slots are mulched to the top to minimize moisture loss through evaporation. The moisture transfer retarding barriers are formed by working the soil surface to enhance crusting, treating the soil with chemicals which congeal the soil, or by placement of water impervious sheet material.

Madrid received U.S. Pat. No. 6,712,969 for a method of phosphorous reduction in stormwater runoff using iron humate, such as in the form of a filter, a layered filter bed, a stacked wall or a liner. The stormwater (fluid) runoff is sent to a fluid retention area such as a retention pond, wetland reservoir or the like where the runoff is filtered through iron humate. While the runoff is filtered, the iron humate absorbs or chemically retains the phosphorous in the runoff to produce filtered runoff with a reduced level of phosphorous. In an alternate embodiment, the runoff can be pumped from a retention pond into a iron humate filter where the runoff is filtered. In another alternate embodiment, the iron humate filter may be placed in a trench below ground to intercept and filter groundwater flows.

McPhillips filed US Published Patent Application 20050161407 disclosing various compositions, devices and methods for use in a variety of environmental remediation barriers such as fiber rolls, mats, blankets and berms. He proposes applications for use including remediation of run-off water, livestock waste, eutrophication waterways and revetment of banks.

Each of the aforementioned patent grants and published applications is purposed to capture and treat run-off pollutants, and in some instances to recycle run-off water. For the record, each of the above discussed patent documents, in its entirety, is incorporated herein by reference.

SUMMARY OF THE INVENTION

It is therefore a primary object of the present invention to provide a system and method which improves upon prior art systems and methodologies and their related drawbacks as described above.

These and other features and utilities of the present general inventive concept may be achieved by providing a chain filter system established at a first elevation to capture runoff in varied natural directions along a slope from a second elevation higher than the first elevation, the chain filter system including a plurality of basins deployed in a chain sequence across said first elevation to capture runoff, each of the basins including a first receiving edge selectively oriented to directly receive the runoff from at least one of the varied natural directions, and a second edge opposite the first receiving edge, and an elongated berm bordering the second edge of each of the plurality of basins to form a basin overflow barrier.

In an exemplary embodiment, each basin further includes a pair of lateral edges joining the first receiving edge and the second edge to define the basin.

In an exemplary embodiment, the shape of each of the plurality of basins is determined according to contours of the slope.

In an exemplary embodiment, the plurality of basins includes a first basin at one end of the chain sequence, and a last basin at an opposite end of the chain sequence, and the elongated berm borders at least one lateral edge of at least one of the first basin and the last basin.

In an exemplary embodiment, one or more of the basins further includes one or more entryways formed in the first receiving edge to admit the runoff.

In an exemplary embodiment, one or more of the basins further comprises treatment media to treat runoff received in the basin.

In an exemplary embodiment, the elongated berm includes one or more scuppers to release captured runoff exceeding a predetermined depth.

In an exemplary embodiment, the elongated berm includes one or more gates to selectively release the captured runoff.

In an exemplary embodiment, a top surface of the berm has a uniform elevation along the length of the berm.

These and other features and utilities of the present general inventive concept may also be achieved by providing a method of capturing runoff flowing in varied natural directions along a slope, the method including forming a plurality of basins in the slope, each basin aligned with one or more of the varied natural directions of runoff flowing down the slope, and forming an elongated berm bordering a downstream edge of each of the plurality of basins to form a basin overflow barrier.

In an exemplary embodiment, the method further includes forming one or more apertures in the elongated berm to release captured runoff.

In an exemplary embodiment, at least one of the one or more apertures is a scupper to release captured runoff exceeding a predetermined depth.

In an exemplary embodiment, at least one of the one or more apertures is a gate to selectively release the captured runoff.

In an exemplary embodiment, at least one of the one or more apertures is a gate.

In an exemplary embodiment, the method further includes forming a second plurality of basins in the slope at a lower elevation, each of the second plurality of basins assigned with one or more flow directions of captured runoff released from the one or more apertures, and forming a second elongated berm bordering a downstream edge of each of the second plurality of basins to form a second basin overflow barrier.

In an exemplary embodiment, forming the elongated berm includes forming a top surface of the berm with a uniform elevation along the length of the berm.

These and other features and utilities of the present general inventive concept may also be achieved by providing a chain filter system established at a first elevation to capture runoff in varied natural directions along a slope from a second elevation higher than the first elevation, the chain filter system including a plurality of basins disposed in a chain sequence across the first elevation to capture runoff, each of the basins comprising a receiving edge selectively oriented to directly receive the runoff from at least one of the varied natural directions, and an elongated berm extending along and between sides of the basins opposite the respective receiving edge of each basin.

In an exemplary embodiment, each of the basins further comprises a pair of lateral edges joining the receiving edge and the side opposite the receiving edge to define the basin.

These and other features and utilities of the present general inventive concept are described herein with specificity so as to make the present invention understandable to one of ordinary skill in the art.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
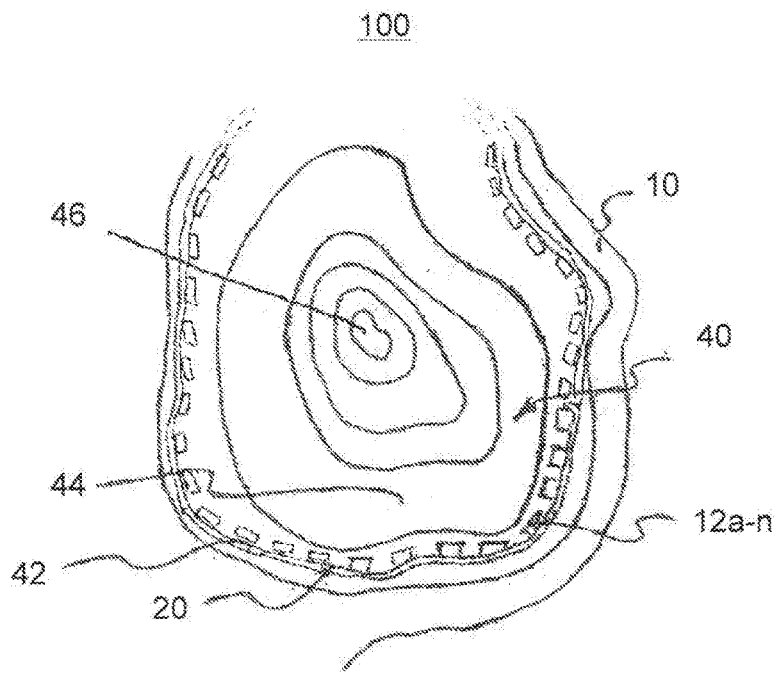
FIG. 1 illustrates an exemplary runoff field including a chain filter system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the preferred embodiments. Thus, the terms used herein are defined based on the intended meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

FIG. 1 is a hypothetical topographical contour profile map of a runoff field 40 including an exemplary embodiment of a chain filter system 100 according to the present general inventive concept. Specifically, FIG. 1 depicts different elevational levels 42, 44, and 46. 46 denotes the highest point, or peak, of runoff field 40. The elevation levels of the runoff field 40 step downward from peak 46, across high elevation level 44 and continuing to the lowest elevation level 42 bordering stream 10. Only three elevation levels 42, 44, and 46 are illustrated in FIG. 1 and described herein for clarity. In exemplary embodiments of the present general inventive concept, any number of elevation levels may be used. Furthermore, stream 10 represents the point at which runoff 30 flowing down the runoff field 40 enters the general water supply for a geographic area. In other exemplary embodiments of the present general inventive concept, stream 10 may be, e.g., a lake or other surface water.

The overall contour from peak 46 to high elevation level 44 to low elevation level 42 naturally determines one or more flow directions 31 for stormwater runoff 30 (illustrated in FIG. 2) as flowing water constantly seeks the lowest elevation. Since slope and profile of any runoff field 40 are never entirely consistent, runoff direction(s) 31 (illustrated in FIG. 2) will always be somewhat varied. In the exemplary embodiments to be discussed herein, runoff field 40 corresponds to a typical agricultural field. However, the chain filter system 100 illustrated therein could also be applied to industrial, municipal, recreational, and residential settings.

Figure 2:
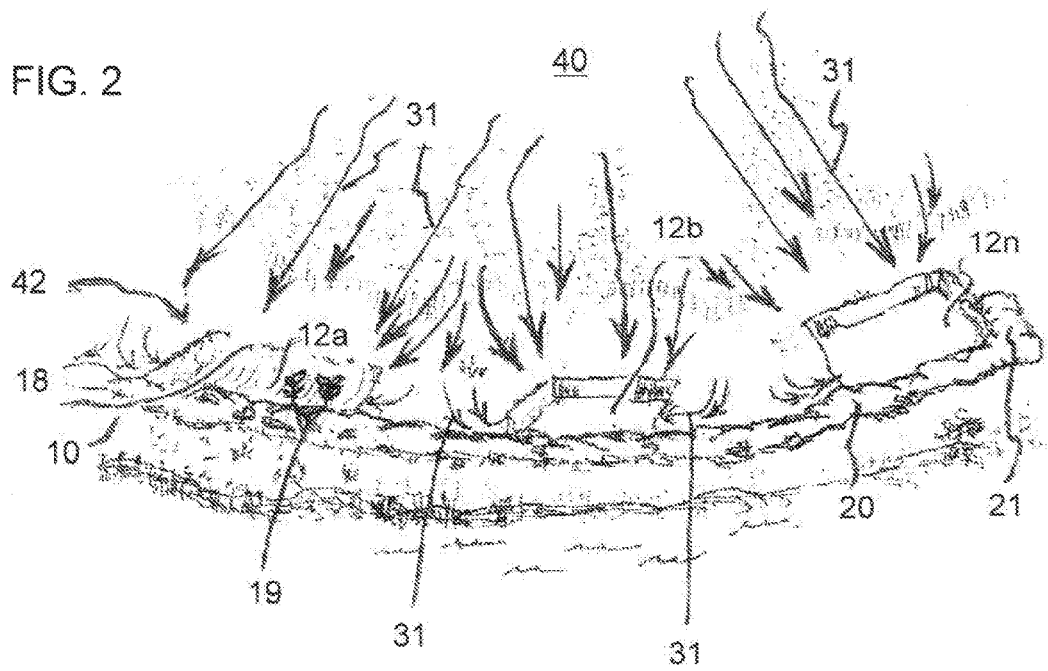
FIG. 2 illustrates multi-directional runoff arrested by a chain-filter system according to an exemplary embodiment of the present general inventive concept.

As illustrated in FIGS. 1 and 2, exemplary embodiments of the present general inventive concept include an in situ chain filter system 100 of basins 12a-n stretched along a desired elevation level (depicted as lower elevation 42 in FIGS. 1-2). The basins 12a-n effectively function as micro wetland cells to capture runoff 30. The basins 12a-n are interconnected or conjoined by a substantially continuous, unitary, raised berm 20 adjacent to said basins' downstream edges 15 (illustrated in FIG. 3) with respect to stormwater runoff 30. Runoff 30 flows into the basins 12a-n through the upstream edge, referred to herein as the first receiving edge 14 of each basin (illustrated in FIG. 3). Runoff 30 may also flow into basins 12a-n when the flow direction 31 of runoff 30 is changed by the berm 20, such that runoff 30 flows into the basins 12a-n. This changing of the flow direction 31 is illustrated in FIG. 2.

The basins 12a-n of the chain filter system 100 are formed at substantially the same elevation level (low elevation level 42 as illustrated in FIGS. 1 and 2). The basins 12a-n may extend over any desired length along this desired elevation level. Since the runoff field 40 includes a peak 46 in a center area thereof, it is possible that the chain filter system 100 of basins 12a-n and berm 20 could be formed entirely about the center area (i.e., the peak 46) of the runoff field 40 to catch all runoff flowing across the runoff field 40. Alternatively the chain filter system 100 may be formed around only a portion of the peak 46. Further, depending on the nature of any actual elevational profile, additional chain filter systems 100 could be established at varying elevation levels, such that multiple chain filter systems 100 are positioned on the same runoff field 40. Each of these chain filter systems 100 would function in substantially the same manner as the exemplary embodiments described herein.

Berm 20 could be any desired height or elevation, but in the exemplary embodiment illustrated in FIG. 1 and discussed herein, the elevation of berm 20 is deemed adequate at about 10 to 12 inches above grade (a term denoting the natural slope of the runoff field 40 at a given point). In an exemplary embodiment of the present general inventive concept, the chain filter system 100 can be designed with the top of the berm 20 on a perfect contour, meaning the berm 20 would be adjusted to match the varying heights of the runoff field 40 such that the top of the berm 20 has the exact same elevation across the entire length of the berm 20. In this "perfect contour" configuration, when the system 100 fills up with water, the system 100 would discharge the accumulated water in a "sheet flow" situation as water flows over the top of berm 20 uniformly over the length of berm 20. Since water flow in this exemplary embodiment does not occur until the system 100 is completely full, and furthermore since flow is not focused on discrete locations on the berm 20 but instead over the entire length of the berm 20, this "sheet flow" situation would minimize the possibly of eroding the berm 20, while enhancing the water storage, filtering, and treatment aspects of the chain filter system 100. However, the system 100 is not limited only to this "perfect contour" embodiment. Considering each site (i.e., each runoff field 40) will be unique unto itself, this "sheet flow" embodiment may not be achievable in every situation. When "sheet flow" is not achievable, it may be more desirable to redirect water flow and possibly release it into a more favorable area by using other means such as, for example, scupper drains 22 or gates 23, discussed in detail infra with reference to FIG. 3. Every implementation of the chain filter system 100 should be site specific to maximize the efficiency of the chain filter system 100.

It will be appreciated that each basin 12 of the chain filter system 100 is, in most cases, positionally oriented slightly differently from other basins 12 in the system 100. This is because flow directions 31a-n (illustrated in FIG. 2) and rate of runoff, as mentioned hereabove, are never consistent at any particular point of the runoff field 40. Accordingly, each individual basin 12 is preferably oriented according to runoff directions 31a-n to capture runoff 30.

In exemplary embodiments of the present general inventive concept, the basins 12a-n and berm 20 are both earthen, i.e., they are both formed primarily out of soil. In an exemplary embodiment of the present general inventive concept, the berm 20 may be formed from, e.g., soil and stone collected while excavating basins 12a-n. However, the basins 12a-n and berm 20 are not limited to earth, and may be formed out different materials depending on the terrain and environment they are used in.

Even where a landscape appears to have a consistently smooth surface as it slopes toward lower elevation, substantially every runoff field 40 will be at least somewhat disrupted by irregular patterns of rivulets, gullies and seams. Stormwater runoff 30 naturally seeks the nearest, lowest elevation when flowing along such irregularities, constantly altering flow direction and acceleration. Strategically excavating a chain filter system 100 for optimum performance in effectively capturing runoff requires thoughtful attention to the varied runoff directions 31a-n as stormwater runoff 30 emerges from elevations 42, 44, and 46. In other words, each of the berm-joined chain filter basins 12a-n should be oriented to present their first receiving edges 14 to the runoff directions 31a-n, so as to directly receive in-flow at the upstream first receiving edge 14.

Figure 4:
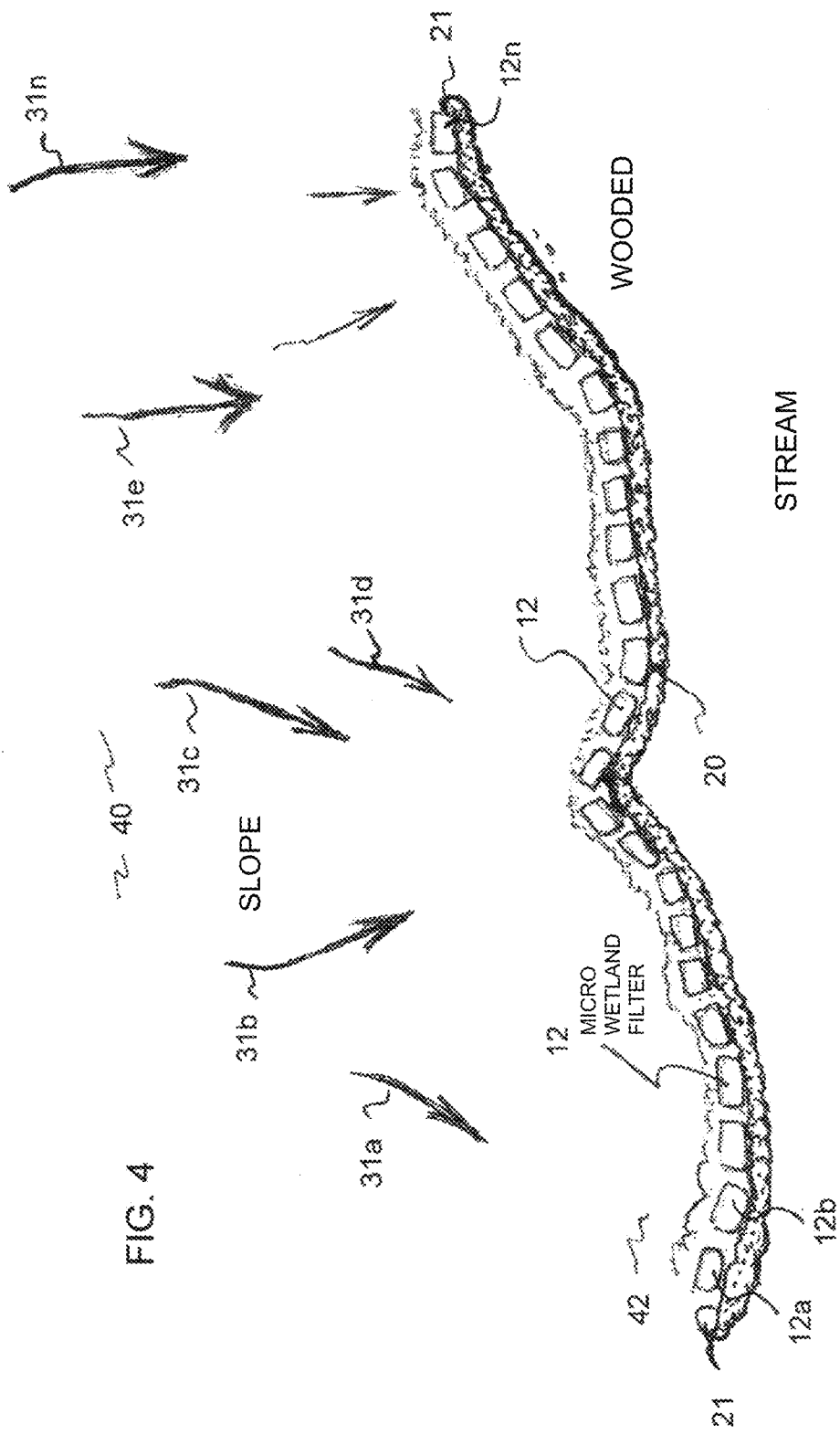
FIG. 4 illustrates a substantially elongated chain filter system formulated to address natural contoured landscape slopes and multi-directional stormwater runoff according to an exemplary embodiment of the present general inventive concept.

FIG. 2 illustrates varied runoff directional flows traveling in directions 31a-n across runoff field 40, going from higher elevation 44 to lower elevation 42. Note that chain filter basins 12a-n, interconnected by the substantially continuous, unitary, raised berm 20 are arranged downstream of directions 31a-n to capture the varied directional flows of runoff 30. At its terminal point, the berm 20 may advantageously curve or hook around a final basin 12n to a berm terminus 21 ensuring retention of captured runoff flow 30. This "hook" feature also may be utilized adjacent the initial basin 12a of the chain filter system 100. As illustrated in FIG. 4, this hook at the initial basin 12a is essentially a mirror image of berm terminus 21.

Figure 3:
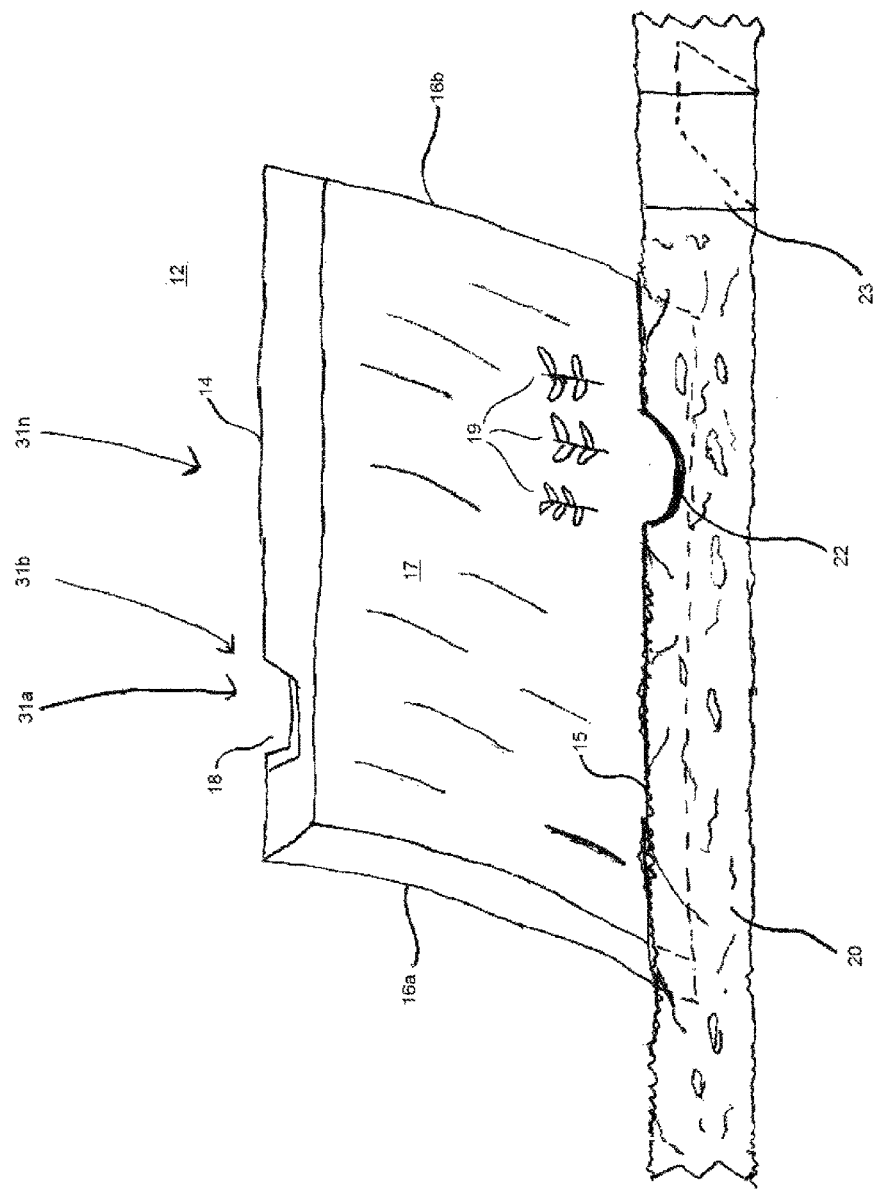
FIG. 3 illustrates a basin and section of a berm according to an exemplary embodiment of the present general inventive concept.

As illustrated in FIGS. 2 and 3, some or all of basins 12a-n may optionally include treatment media 19 in a basin floor 17. This treatment media 19 may be any type of natural or manmade treatment media intended for runoff treatment, including, for example, wood chips, sand, rocks, rip rap (loose stones), vegetation, and slag stones, as well as any combination thereof. Furthermore, as illustrated in FIG. 3, if a basin 12 includes treatment media 19, the treatment media 19 may cover some or all of the basin floor 17.

Basin excavation details may vary, yet still fall within the scope of the present general inventive concept. For example, the first receiving edge 14 of a basin 12 does not necessarily require significant excavation (or cutting) since the upstream basin 12 area will usually be "walled" by the slope of runoff field 40 itself. For example, basin 12 viewable at the left region of FIG. 2 demonstrates an only slightly excavated entryway 18 to accept runoff 30.

FIG. 3 illustrates an exemplary embodiment of a single basin 12 and associated section of the berm 20. As illustrated therein, each basin 12 may have a substantially quadrilateral shape, with a first receiving edge 14, which is selectively oriented along the basin's upstream (runoff-receiving) zone to directly receive runoff 30 traveling from, e.g., higher elevation level 44 to lower elevation level 42. The first receiving edge 14 may be made uniform such that runoff 30 flows into the basin at any point along the first receiving edge 14. Alternatively, the first receiving edge 14 may include one or more entryways 18 to accept runoff 30, such that most of the runoff 30 entering the basin 12 enters through the entryway(s) 18.

Each basin 12 may further comprise a second edge 15 opposite the first receiving edge 14. The second edge 15, also referred to herein as the downstream edge, is adjacent to the berm 20. The first receiving edge 14 and second edge 15 are connected by a pair of lateral edges 16a and 16b, such that the four edges 14, 15, 16a, and 16b define the perimeter of the basin 12 around the basin floor 17. In an exemplary embodiment of the present general inventive concept, lateral edges 16a and 16b are parallel. In another exemplary embodiment of the present general inventive concept, the lateral edges 16a and 16b are not parallel. Second edge 15 and lateral edges 16a and 16b may also receive runoff 30, for example if the flow direction 31 is changed by the berm 20, as described above and illustrated in FIG. 2.

Figure 5:
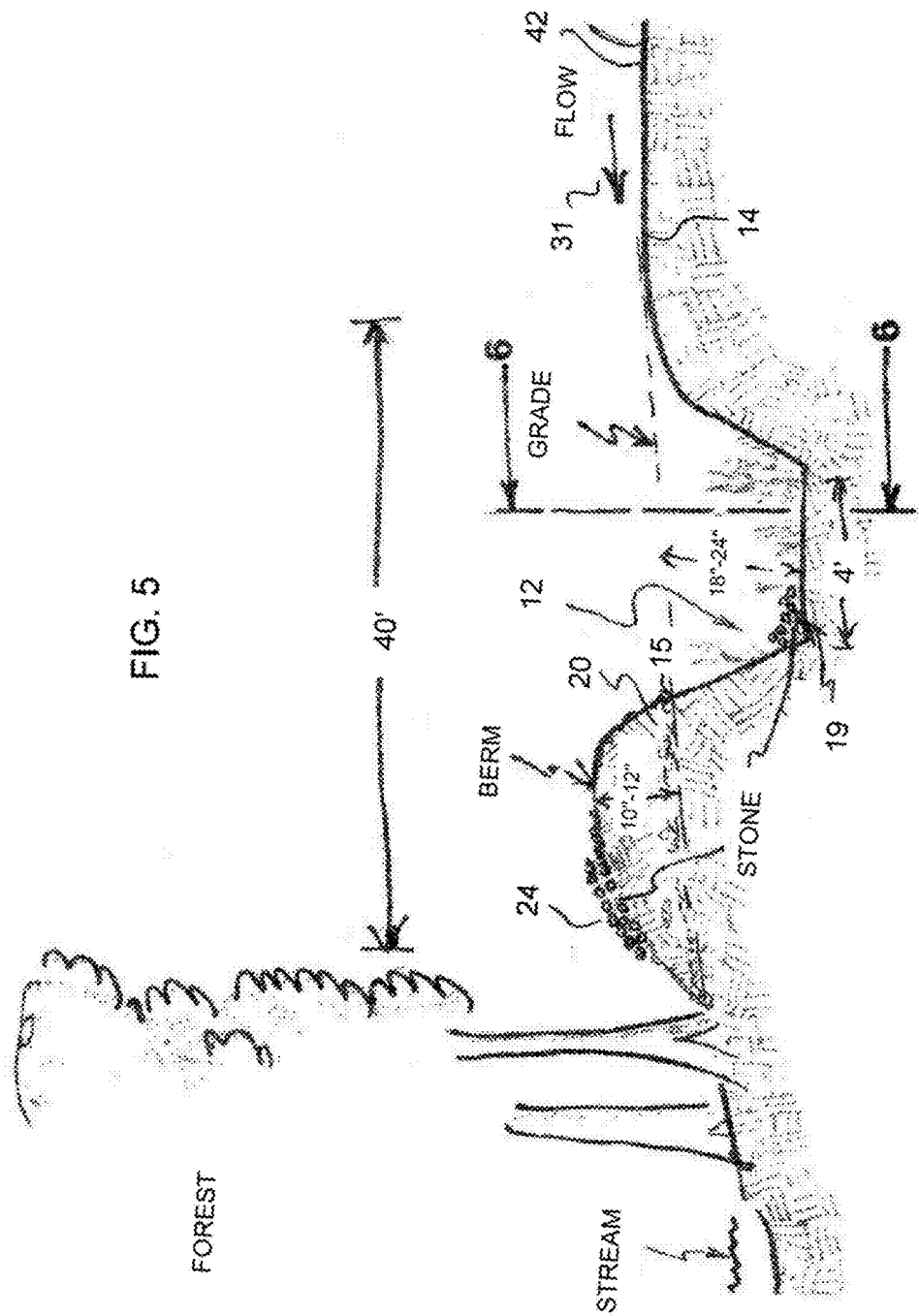
FIG. 5 depicts a cross-sectional view of a chain filter system basin viewed transverse of general runoff flow direction according to an exemplary embodiment of the present general inventive concept.
Figure 6:
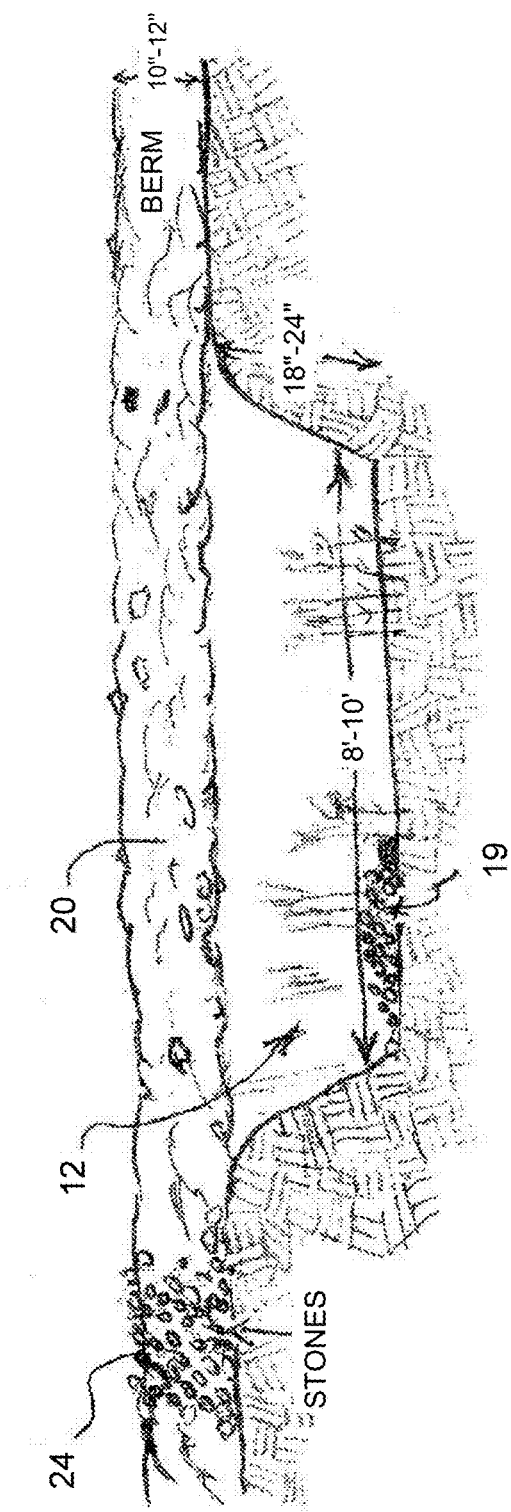
FIG. 6 depicts a cross-sectional view of the basin illustrated in FIG. 5, but in a general direction of runoff inflow.

Although the basin 12 illustrated in FIG. 3 has a substantially quadrilateral shape, this is only an exemplary embodiment of the present general inventive concept. In other exemplary embodiments, a basin 12 may have any shape suited to capture runoff 30. The shape of each basin 12 may be determined based on the specific contours and aspects of the runoff field 40 and flow directions 31a-n. However, regardless of overall shape each basin 12 preferably has a first receiving edge 14 oriented to receive runoff 30 as described above. Furthermore, according to exemplary embodiments of the present general inventive concept each basin 12 has a relatively flat floor 17, such that runoff 30 captured in basin 12 is distributed evenly along the floor 17, instead of pooling on one side. An exemplary embodiment of such a basin 12 with a substantially flat floor 17 is illustrated in FIGS. 5-6.

As further illustrated in FIG. 3, the berm 20 may optionally include one or more apertures to intentionally release captured runoff 30. These apertures may take the form of one or more flow scuppers 22 or gates 23. A scupper 22 comprises a hole or depression built into the berm 20, such that when captured runoff 30 reaches the level of the scupper 22, the runoff 30 is allowed to flow through the scupper 22. In contrast, a gate 23 comprises a hole in the berm 20 which may be opened and closed similar to a dam, thereby allowing control over whether to allow runoff 30 to exit the chain filter system 100. In FIG. 3, the gate 23 is illustrated in a closed position, and an open position illustrated in dashed lines. A scupper 22 functions effectively as an overflow control, allowing runoff 30 to exit the chain filter system 100 at a known location, to thereby control the flow out of berm 20. A gate 23 fulfills substantially the same role as a scupper 22 and also allows for controlled release of water from the chain filter system 100 at varying depths, by controlling the degree to which the gate 23 is opened.

Scuppers 22 and/or gates 23 may be used when the "perfect contour" scenario described above, in which water is allowed to flow continuously over the entire length of the berm 20, is not feasible or not desirable. Although flow control devices such as scuppers 22 and gates 23 may not control erosion of the berm 20 as effectively as a "perfect contour" construction, they do allow water to be released from the chain filter system 100 at defined locations, resulting in more predictable flows out of the berm 20 than if water flows over the berm 20. These more predictable flows may more easily be directed to a desired location, such as, for example, another chain filter system 100 positioned at a lower elevation level of the runoff field 40.

In an exemplary embodiment of the present general inventive concept, the scuppers 22 or gates 23 could direct the released runoff 30 to a water source, e.g., the stream 10. In other exemplary embodiments of the present general inventive concept, the scuppers 22 or gates 23 could direct the released runoff 30 to another chain filter system 100 arranged downstream, to further control the runoff 30. Runoff flow 30 released from a scupper 22 or gate 23 of a first chain filter system 100 could flow further down the runoff field 40 to another chain filter system 100 constructed at a lower elevation level. This lower chain filter system 100 would function similarly to the first chain filter system 100, capturing runoff 30 from directional flows coming from the scuppers 22 or gates 23 of the first chain filter system 100.

FIG. 4 is a dramatically depicted version of a chain filter system 100 according to an exemplary embodiment of the present general inventive concept. As illustrated therein, basins 12a-n stretch generally end to end across a broad runoff field 40. As discussed above, each of these basins 12 is custom-excavated with respect to adjacent topography from which the water flows. Basins 12a-n perform best when properly oriented with respect to bordering landscape features. Rivulets across runoff field 40 rarely occur consistently across the terrain. Where the rivulets laterally converge, subtle or dramatic depressions or gullies are formed. Ever-seeking the fastest path, stormwater runoff 30 picks up speed and alters course to chase the receding contour. Constructed and positioned as discussed hereabove, unique, custom-oriented basins 12a-n of a chain filter system 100 await.

FIG. 5 illustrates a cross-sectional view of a basin 12 according to an exemplary embodiment of the present general inventive concept. This cross-sectional view presents a view taken transverse a flow direction 31 of runoff 30. In an exemplary embodiment of the present general inventive concept, each typical basin 12 may have a depth of about 12-24 inches, or more preferably 18-24 inches. Each typical basin 12 may have a bottom width (i.e., width of the basin floor 17 in the direction of the first receiving edge 14 to the second edge 15) of about 4 feet. Down-slope of basin 12, positioned adjacent to second edge 15 and posing a barrier to runoff overflow, is berm 20. Berm 20 is elongated to interconnect with adjacent basin 12 berms, thereby forming a substantially continuous berm 20, and may rise about 10-12 inches above grade—then sloping downgrade toward stream 10. The width from the first receiving edge 14 of a basin 12 to the downstream edge of berm 20 may be about 40 feet. Note FIG. 5 includes view-line 6-6 introducing the sectional view illustrated in FIG. 6.

FIG. 6, viewed in a down-slope runoff direction 31, again suggests basin 12 depth of about 18-24 inches and basin bottom breadth (i.e. the breadth of basin floor 17 as measured between sidewalls 16a and 16b) of about 8-10 feet. Again, the berm 20 may rise about 10-12 inches above grade. Note in FIGS. 5 and 6, the berm 20 may include reinforcement media 24, e.g. stones and/or vegetation, strategically placed to stabilize or strengthen the berm 20.

It will be understood that the dimensions illustrated in FIGS. 5 and 6 are for example purposes only. The exact dimensions of the basin 12 and the berm 20 are site-specific, and may vary depending on the specific characteristics of the runoff field 40 where the chain filter system 100 is implemented. The goal of each specific implementation of the chain filter system 100 (e.g., retention of runoff 30 in the system 100 vs. directing runoff 30 via scuppers 22 or gates 23) may also affect the dimensions of each basin 12 and the berm 20.

Once runoff 30 is captured in basins 12a-n, it may be allowed to naturally evaporate or sink into the ground. If runoff 30 exceeds the height of the berm 20, it may be allowed to run over the top of berm 20. Alternatively, if the berm 20 includes one or more gates 23, runoff 30 may be released from the system 100 in a controlled fashion. This release may take place after a predetermined time, to let pollutants in the captured runoff 30 settle to the bottom of the basins 12a-n such that relatively clean water is released from the gates 23. Furthermore, if basins 12a-n include treatment media 19, the captured runoff 30 may be treated via the treatment media 19 such that when the runoff 30 is released through, e.g., a gate 23, or when it sinks into the ground, it has been substantially cleansed of pollutants by the treatment media 19. In this manner, the captured runoff 30 will not contaminate the surface water (e.g., lakes and rivers) or the ground water of the surrounding area.

The chain filter system 100 according to exemplary embodiments of the present general inventive concept is effective, simple, and straightforward, offering significant benefits over the prior art. It is easily replicable and scalable—it does not require a grand plan for a huge plot of terrain, and can in fact be implemented on any size landscape, or even scaled up or down as necessary. There is no requirement for, e.g., multiple elevation levels, multiple tiers of filters, or long tracts of terrain. Rather, a series of basins 12a-n is formed at a single elevation level, spread out to catch runoff coming from many varied naturally forming directions 31a-n. As a result, an entire landscape does not need to be shaped. Rather, the basins 12a-n can be formed at a desired elevation level and runoff may follow the natural contours of the land leading up to the basins 12a-n.

Presently, at a location near Chestertown, Md., the above disclosed system has been excavated on the general shape and scale described herein, and is being maintained and studied as a micro-wetlands pilot project to mitigate stormwater runoff and to arrest sediment and nutrient laden agricultural stormwater from entering along the Chesapeake Bay watershed along the U.S. Eastern Coast.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A chain filter system established at a first elevation to capture runoff in varied natural directions along a slope from a second elevation higher than the first elevation, the chain filter system comprising:
   a plurality of basins deployed in a chain sequence across said first elevation to capture runoff, each of the basins comprising:
      a first receiving edge selectively oriented to directly receive the runoff from at least one of the varied natural directions; and
      a second edge opposite the first receiving edge; and
   an elongated berm bordering the second edge of each of the plurality of basins to form a basin overflow barrier.

2. The chain filter system of claim 1, wherein each basin further comprises:
   a pair of lateral edges joining the first receiving edge and the second edge to define the basin.

3. The chain filter system of claim 1, wherein the shape of each of the plurality of basins is determined according to contours of the slope.

4. The chain filter system of claim 1, wherein:
   the plurality of basins includes:
      a first basin at one end of the chain sequence; and
      a last basin at an opposite end of the chain sequence; and
   the elongated berm borders at least one lateral edge of at least one of the first basin and the last basin.

5. The chain filter system of claim 1, wherein one or more of the basins further comprise one or more entryways formed in the first receiving edge to admit the runoff.

6. The chain filter system of claim 1, wherein one or more of the basins further comprises treatment media to treat runoff received in the basin.

7. The chain filter system of claim 1, wherein the elongated berm comprises one or more scuppers to release captured runoff exceeding a predetermined depth.

8. The chain filter system of claim 1, wherein the elongated berm includes one or more gates to selectively release the captured runoff.

9. The chain filter system of claim 1, wherein a top surface of the berm has a uniform elevation along the length of the berm.

10. A method of capturing runoff flowing in varied natural directions along a slope, the method comprising:
    forming a plurality of basins in the slope, each basin aligned with one or more of the varied natural directions of runoff flowing down the slope; and
    forming an elongated berm bordering a downstream edge of each of the plurality of basins to form a basin overflow barrier.

11. The method of claim 10, further comprising:
    forming one or more apertures in the elongated berm to release captured runoff.

12. The method of claim 11, wherein at least one of the one or more apertures is a scupper to release captured runoff exceeding a predetermined depth.

13. The method of claim 11, wherein at least one of the one or more apertures is a gate to selectively release the captured runoff.

14. The method of claim 11, wherein at least one of the one or more apertures is a gate.

15. The method of claim 11, further comprising:
    forming a second plurality of basins in the slope at a lower elevation, each of the second plurality of basins assigned with one or more flow directions of captured runoff released from the one or more apertures; and
    forming a second elongated berm bordering a downstream edge of each of the second plurality of basins to form a second basin overflow barrier.

16. The method of claim 10, wherein forming the elongated berm comprises forming a top surface of the berm with a uniform elevation along the length of the berm.

17. A chain filter system established at a first elevation to capture runoff in varied natural directions along a slope from a second elevation higher than the first elevation, the chain filter system comprising:

a plurality of basins disposed in a chain sequence across the first elevation to capture runoff, each of the basins comprising a receiving edge selectively oriented to directly receive the runoff from at least one of the varied natural directions; and an elongated berm extending along and between sides of the basins opposite the respective receiving edge of each basin.

18. The chain filter system of claim 17, wherein:

each of the basins further comprises a pair of lateral edges joining the receiving edge and the side opposite the receiving edge to define the basin.

* * * * *